US012653648B2

(12) United States Patent
Jo et al.

(10) Patent No.: US 12,653,648 B2
(45) Date of Patent: Jun. 16, 2026

(54) GAUGE FOR VERIFICATION OF 3-D IMAGES

(71) Applicant: DENTSPLY SIRONA Inc., York, PA (US)

(72) Inventors: Jeremy E. Jo, York, PA (US); Michael K. Caselli, York, PA (US)

(73) Assignee: Dentsply Sirona Inc., York, PA (US)

( * ) Notice: Subject to any disclaimer, the term of this patent is extended or adjusted under 35 U.S.C. 154(b) by 1072 days.

(21) Appl. No.: 16/955,885

(22) PCT Filed: Dec. 18, 2018

(86) PCT No.: PCT/US2018/066151
§ 371 (c)(1),
(2) Date: Jun. 19, 2020

(87) PCT Pub. No.: WO2019/126115
PCT Pub. Date: Jun. 27, 2019

(65) Prior Publication Data
US 2021/0113308 A1 Apr. 22, 2021

Related U.S. Application Data

(60) Provisional application No. 62/607,942, filed on Dec. 20, 2017.

(51) Int. Cl.
*A61C 9/00* (2006.01)
*G06T 7/00* (2017.01)
*G06T 15/10* (2011.01)

(52) U.S. Cl.
CPC .......... *A61C 9/0053* (2013.01); *G06T 7/0014* (2013.01); *G06T 15/10* (2013.01); *G06T 2207/30036* (2013.01)

(58) Field of Classification Search
CPC ..... A61C 9/0053; A61C 19/04; G06T 7/0014; G06T 2207/30036
See application file for complete search history.

(56) References Cited

U.S. PATENT DOCUMENTS

| | | | |
|---|---|---|---|
| 4,277,237 A | 7/1981 | Dermer | |
| 2018/0028292 A1* | 2/2018 | Pesach | A61C 9/004 |
| 2018/0221109 A1* | 8/2018 | Chung | A61B 17/17 |

FOREIGN PATENT DOCUMENTS

| | | | |
|---|---|---|---|
| CA | 3086482 A1 | 6/2019 | |
| CN | 205849573 | * | 1/2017 |
| EP | 3727189 A1 | 10/2020 | |

(Continued)

OTHER PUBLICATIONS

"European Application Serial No. 18830688.0, Communication Pursuant to Article 94(3) EPC mailed Sep. 3, 2021", 6 pgs.

(Continued)

*Primary Examiner* — Rehana Perveen
*Assistant Examiner* — Cuong V Luu
(74) *Attorney, Agent, or Firm* — SCHWEGMAN LUNDBERG & WOESSNER, P.A.

(57) ABSTRACT

A verification gauge for use in improving the accuracy of a 3D scan. A bar of adjustable length has a first and second ends that can be affixed between two points of the oral-cavity. The bar is scannable and has a visual indicia thereon to verify and determine the length and relative position between the two points.

8 Claims, 7 Drawing Sheets

(56)     References Cited

FOREIGN PATENT DOCUMENTS

| EP | 3727189 B1 | 8/2024 |
| JP | 2015516856 | 6/2015 |
| JP | 2021506445 A | 2/2021 |
| JP | 7374093 B2 | 10/2023 |
| KR | 20140113971 | 9/2014 |
| KR | 20200100769 A | 8/2020 |
| KR | 102798433 B1 | 4/2025 |
| WO | WO-2017018563 A1 | 2/2017 |
| WO | WO-2019126115 A1 | 6/2019 |

OTHER PUBLICATIONS

"European Application Serial No. 18830688.0, Response filed Mar. 4, 2024 to Intention to Grant mailed Oct. 24, 2023", 10 pgs.

"European Application Serial No. 18830688.0, Response filed Aug. 16, 2022 to Communication Pursuant to Article 94(3) EPC mailed Sep. 3, 2021", 4 pgs.

"European Application Serial No. 18830688.0, Response filed Sep. 15, 2023 to Summons to attend oral proceedings pursuant to Rule 115(1) EPC mailed Mar. 10, 2023", 80 pgs.

"European Application Serial No. 18830688.0, Response to Communication pursuant to Rules 161(1) and 162 EPC filed Feb. 22, 2021", 19 pgs.

"European Application Serial No. 18830688.0, Summons to attend oral proceedings pursuant to Rule 115(1) EPC mailed Mar. 10, 2023", 9 pgs.

"International Application Serial No. PCT/US2018/066151, International Preliminary Report on Patentability mailed Jul. 2, 2020", 8 pgs.

"International Application Serial No. PCT/US2018/066151, International Search Report mailed Mar. 13, 2019", 3 pgs.

"International Application Serial No. PCT/US2018/066151, Written Opinion mailed Mar. 13, 2019", 6 pgs.

"Canadian Application Serial No. 3,086,482, Office Action mailed Jan. 7, 2025", 5 pgs.

"Canadian Application Serial No. 3,086,482, Response Filed May 7, 2025 to Office Action mailed Jan. 7, 2025", 25 pgs.

"Canadian Application Serial No. 3,086,482, Office Action mailed Sep. 26, 2025", 4 pgs.

"Japanese Application Serial No. 2020-533644, Notification of Reasons for Rejection mailed Jan. 24, 2023", W/English Translation, 12 pgs.

"Japanese Application Serial No. 2020-533644, Response filed Jun. 22, 2023 to Notification of Reasons for Rejection mailed Jan. 24, 2023", W/English Claims, 19 pgs.

* cited by examiner non-uniform
scaling

GAUGE FOR VERIFICATION OF 3-D IMAGES

FIELD OF THE INVENTION

The invention relates to a device and methods to improve the accuracy of 3-D images of 3-D objects, particularly to dental or medical imaging. More particularly, the invention relates to improving the accuracy of 3-D images wherein a plurality of images are made and stitched together to represent a larger area. A verification gauge is provided with a visual and imagable scale (that is a scale that is able to be scanned) to correct discrepancies between the plurality of scans. At least one second scan is made including scanning the gauge, and the second scan is used to correct the discrepancies to the digital image made from the stitched first scans.

BACKGROUND

Many surgical procedures concern the temporary or permanent insertion, into the soft or bony tissue of a patient, of prosthetic and other artificial devices that are required to fit the anatomy of the patient to a very high degree of precision and accuracy. One such application concerns implant dentistry, in the course of which one or more often metallic implant anchors are surgically placed within the jawbone of a patient, to receive and support prosthetic components designed to simulate and replace one or more natural teeth lost by the patient. It is well known that, to be wholly successful, implant procedures must adhere to very strict placement, orientation and sizing requirements determined by existing bone structure and dentition, whereby the prosthetic components to be fitted onto surgically-placed implant anchors must preferably be designed, shaped and sized specifically to conform to the precise anatomical geometry of the patient, including the location, shape and size of adjoining teeth, and must transition to the precise orientation of the principal axis of the supporting implant anchor with a high degree of accuracy.

Conventional methods for meeting these rigorous requirements provide for the creation of a model of the patient's jaw and dentition, the making of said model comprising the taking of a so-called "impression" of the patient's dentition, using a malleable substance placed over and around the teeth in the patient's mouth comprising the entire dental arch. Where the placement of implants and restorative components is a factor, typically this impression is taken following the surgical insertion of the implant anchors. Typically, reference components called impression copings are affixed to the external extremity of the inserted implant anchors, and serve to reference the location and angular orientation of the anchors. Subsequently, a model made from a mold based on said impression will incorporate so-called "analog" anchors to model the anchors in the patient's jaw, and prosthetic devices for said anchors will be designed and manufactured based on the geometry of the model created as described.

In actual practice the conventional procedure described above is fraught with numerous difficulties and shortcomings. It has proven impossible for dental practitioners to make dental impressions, and thus models, that are consistently free of dimensional and positional errors; so rigorous are the geometrical requirements involved in such applications that even a sub-millimeter dimensioning error, or a 1 or 2 degree orientation error, will result in prosthetic placements that give rise to unacceptable stresses and conditions.

In the dental arts, efforts have been made to employ image-based modeling techniques to address these well-known problems of conventional implant dentistry procedures. In these efforts, images are taken of the patient's mouth, and a three-dimensional model of the pertinent regions is recreated using so-called three-dimensional image processing techniques and software. In the art of 3-D imaging, it is often the case that a larger image is made by combining or stitching together overlapping images or "scans." An algorithm is often used to register identifiable points on the object to be scanned and or the surrounding area. By such registration, a plurality of scans can be stitched together to produce a digital representation of a larger area. For example, in the area of dentistry, a scanning device can be inserted into the oral cavity and a number of scan images can be obtained. Identifiable points in the oral cavity can be used to register the different scan images, such as points on a tooth or a dental appliance of some kind. While any dental appliance can be used, a useful one is commonly known as a scan flag.

It has been found that soft tissue, including the gums are not good choices for registering the different scans with respect to each other. Being soft, such surfaces can be easily moved such that a point I on scan may not be in the exact same location in a second scan. Also, minor movement of the patient during the scan can cause even fixed points in hard tissue to be slightly off between scan procedures. Hence, the stitched scan images are not always precisely located, meaning that the resulting stitched digital representation of the target is not suitably rendered. In some procedures such as in dental implant procedures, this is a particular concern as precise location of an implant is important for a number of reasons. This includes for example, the position of the restorative placed upon the implant and the avoidance of nerves and the like when an implant is placed. In short, it is advantageous for the resulting digital image to be as precise as possible so that subsequent procedures can be based upon such images with confidence.

SUMMARY

According to the invention, a gauge to verify the accuracy of an image of at least a portion of the oral cavity which is formed from a plurality of intra-oral scans of the oral cavity of a patient. The gauge includes a bar of adjustable length and removably affixable between two points in the oral cavity. The bar has a first and a second end and is scannable by the intra-oral scan. By "scannable" it is meant that it shows on a standard image scan. As such it may be made of a metal, plastic or other material that is subject to being scanned and showing up as a scanned image, such as a radio-opaque scanned image.

The relative position and/or measurement of the distance between the two points is thereby verified by the visual indicia and digitally by the scan of the bar. The bar is affixable at at least one of its ends to for example, the patient's dentition, a dental appliance, a dental implant component including the implant, its abutment, healing caps and the like without limitation. As used herein dental implant and dental implant component will be used interchangeably to refer to all such components.

In addition, a method of improving the accuracy of a digital image the oral cavity of a patient includes making a plurality of first intraoral scans of the oral cavity. The data from the first intraoral scans is used to construct a digital image of at least a portion of the oral cavity. A gauge is provided having a bar of adjustable length and removably affixable between two points in the oral cavity. The bar has a first and a second end, such that it is removably secured at its first end to one of the points in the oral cavity and the second end of the bar to the other point in the oral cavity. At least one second intraoral scan of the oral cavity is made, including scanning at least a portion of the bar. The data from the second scan is used to make correction adjustments to the digital image.

DETAILED DESCRIPTION

Figure 1:
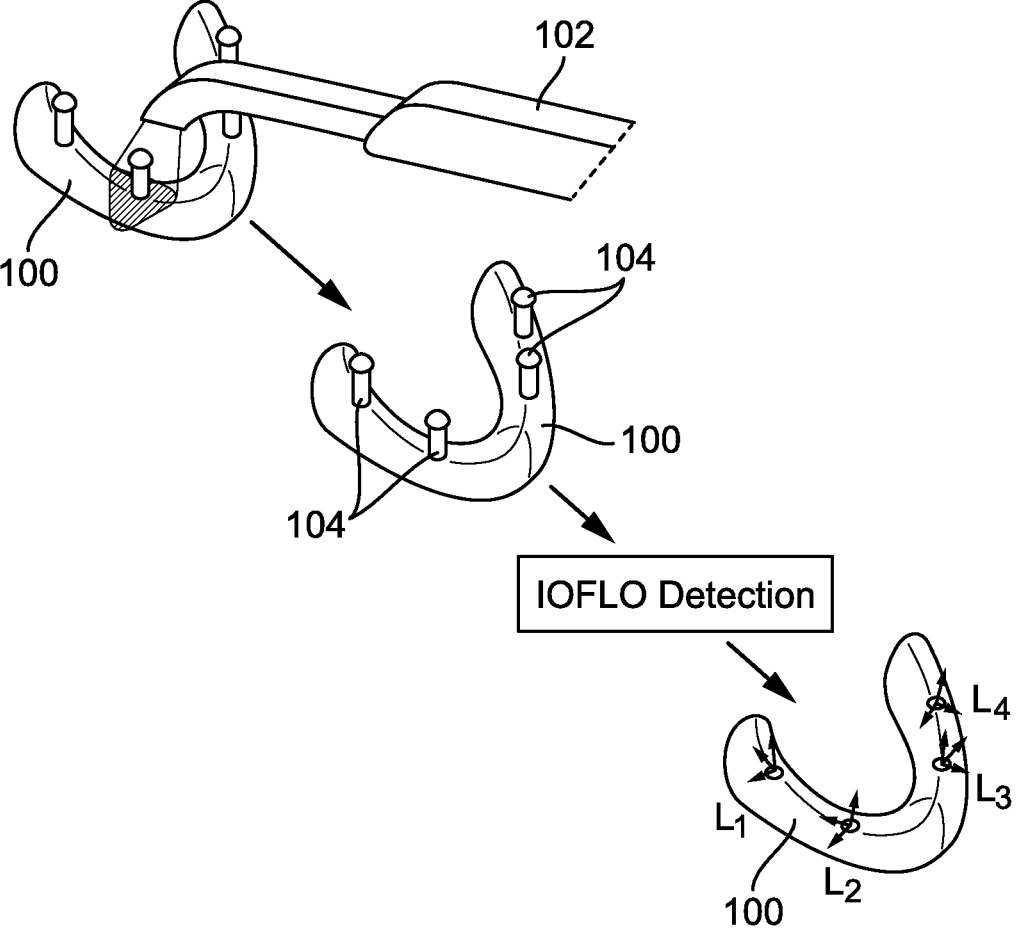
FIG. 1 is a depiction of Method One described herein.

There is provided according to the present invention and as shown on the drawings, a gauge 10 made of a material as described hereinabove. According to the invention, gauge 10 is used to verify the accuracy of an image of at least a portion of the oral cavity which is formed from a plurality of intra-oral or other scans of the oral cavity of a patient. The gauge includes a bar 11 of adjustable length and removably affixable between two points 12, 13 in the oral cavity. The bar 11 has a first and a second end 14 and 15 respectively, and is scannable by an intra-oral scanner, in order to determine the distance D between two points 12, 13 in the oral cavity. The bar 11 preferably has a scale such as Vernier scale 21, or other suitable indicia, to show relative position or distance D between ends 14, 15 and hence, the same between points 12, 13. The measurement of the distance between the two points 12, 13 is thereby verified by the visual indicia 21 and digitally by the scan of the bar 11. The bar 11 is affixable at least one of its ends 14, 15 to for example, the patient's dentition, a dental appliance, a dental implant component including the implant 30 or its abutment 31, healing cap and the like without limitation. As used herein dental implant and dental implant component will be used interchangeably to refer to all such components.

Figure 2:
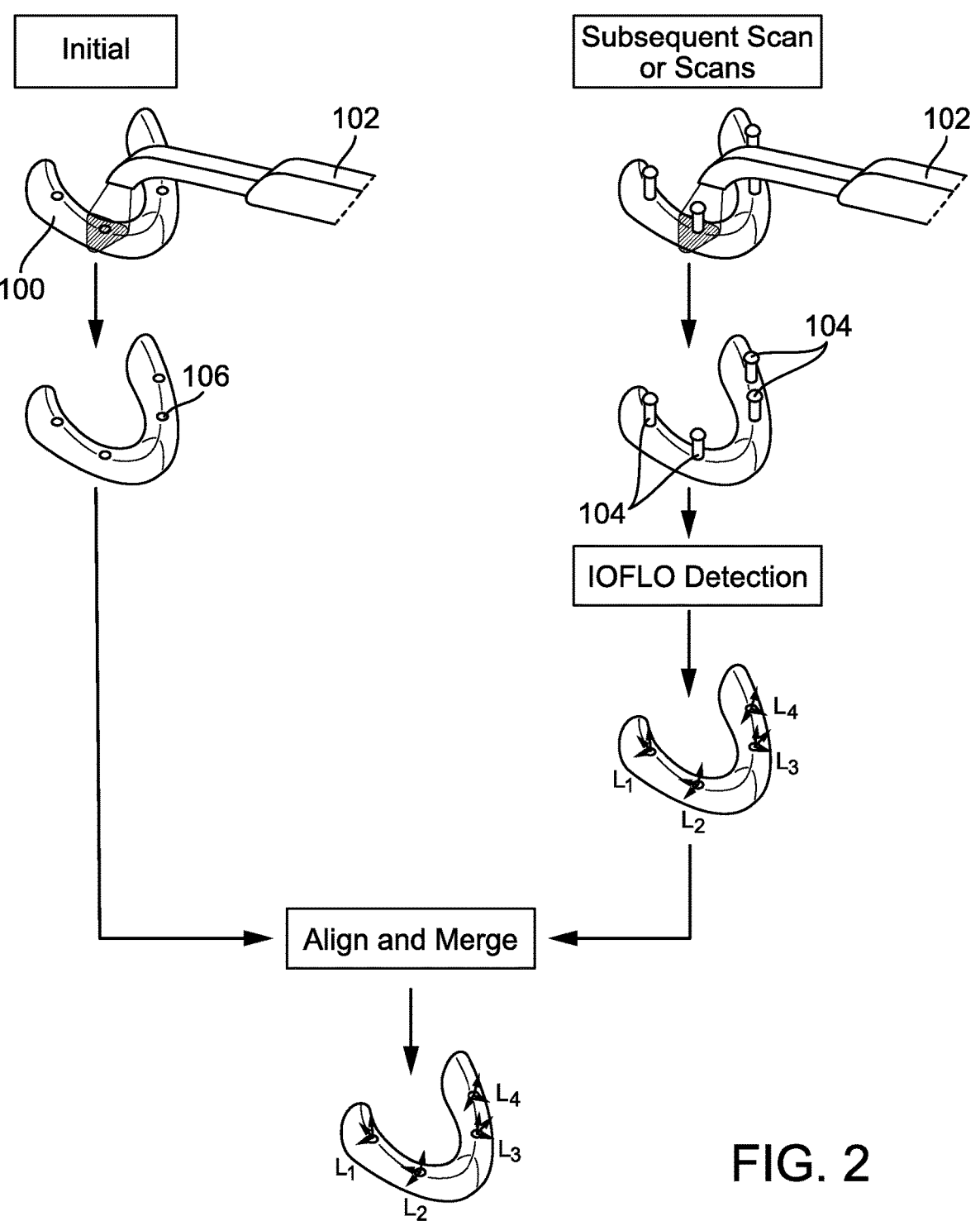
FIG. 2 is a depiction of Method Two described herein.

Use of the present invention in inventive methods will be described in the following examples. Reference is made to IOFLO scan flags available from Dentsply Sirona Inc. of York PA
Method One:

This method is a complete intraoral scan with the scan flags placed in their respective implants. Here, a single scan by any oral scanner 102, such as an OPTISCAN® from Dentsply Sirona Inc. would detect the gingival soft tissue along the maxillary or mandibular arch 100, along with the necessary features of the scan flag 104 to enable detection of the implant locations and orientations from the resulting 3D scan file. In FIG. 1, the term IOFLO is used as a representation of a DENTSPLY SIRONA specific scan flag, but any generic scan flag can also be used in this method.
Method Two:

Method two begins with an initial scan of the edentulous space to capture the soft tissue and the general shape of the arch 100. No scan flags are present in this initial scan, but instead the implant locations 106 are present. The implant locations are present and may have a healing cap (not shown) placed over any implant (not shown) found in each implant location 106. Subsequent scans are conducted with the scan flags 104 placed into the implants. These scans may cover the entire clinically relevant area (as in the prior scan), or it may capture just the scan flags and the immediately surrounding edentulous space (e.g. within a 2-10 mm radius of the scan flag). The auxiliary scan is processed using a detection algorithm to detect the location of the scan flags within the scan data, and thereby determine the implant location and orientation (FIG. 2).

The implant locations obtained from the subsequent scan must be aligned and merged to the dental anatomy obtained in the initial scan. This alignment can take place before or after IOFLO detection, though if alignment occurs after IOFLO detection, the detected locations must be transformed according to the alignment results.
Method One-A This method is a complete intraoral scan where the scan flags 104 and/or the digital verification gauges 10 are placed in the oral cavity. The single scan would detect the gingival soft tissue along the mandibular arch 100, along with the necessary indicators to measure the critical features of an implant orientation. In this embodiment, the gauge 10 can either be used in conjunction with existing scan flags 104, or extra implant identifying features can be integrated into the gauge that replicate the function of a scan flag. If the gauge 10 and the scan flags 104 are to be used together, the two devices would attach either actively or passively with each other and the location to the implant will be preserved though the coupling to the two devices. Information from each of the scans can be used to stitch together an accurate representation of the underlying edentulous space.

Figure 3:
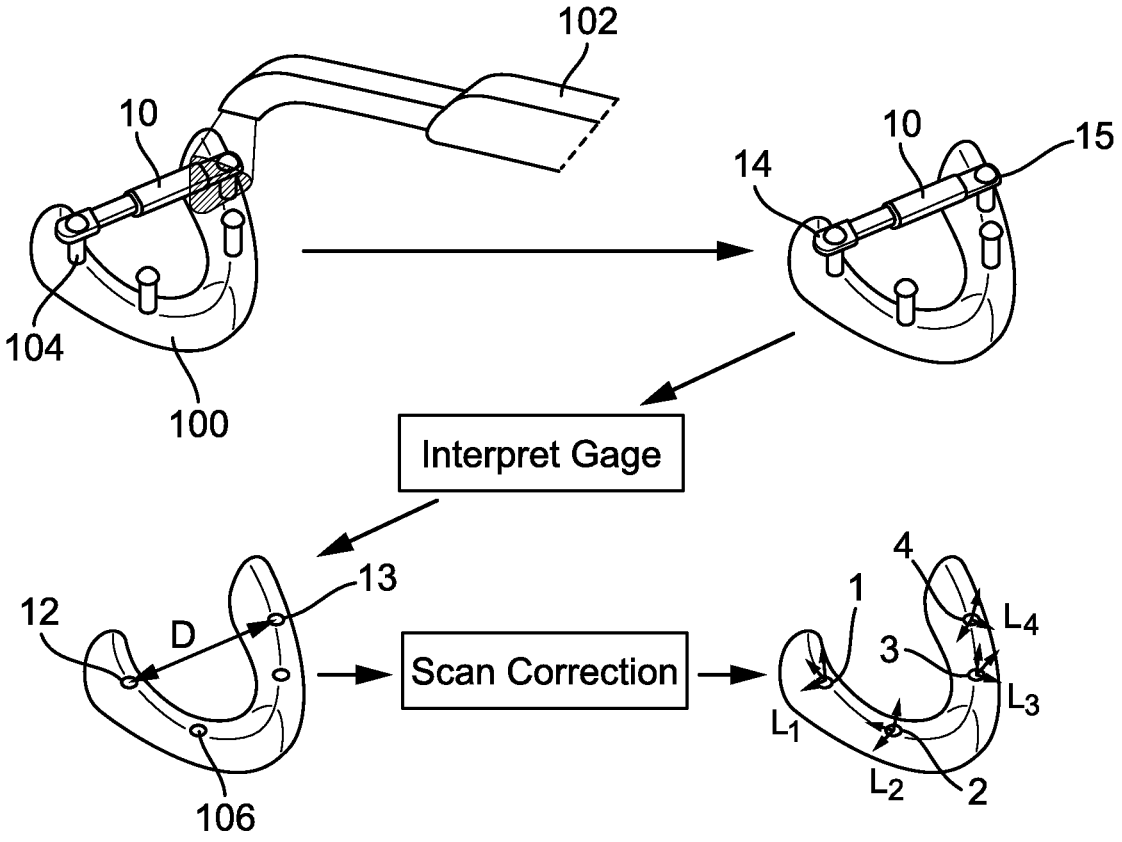
FIG. 3 is a depiction of Method One-A described herein.

In this method, the single scan can be repeated multiple times depending on the number of implants in the edentulous restoration. For example, if there are 4 implants, one to six total individual scans may be required. This can be from one implant to implant location, or up to every possible implant to implant combination. For example, if the implants are number 1, 2, 3, and 4, the possible combinations include: L1-L2, L1-L3, L1-L4, L2-L3, L2-L4, and L3-L4. Not all multiples may be required, and only the implant to implant distances representing the longest lengthwise distance may be necessary. The maximum critical number of scans be quantified as, $[(n^*(n-1)]/2$, where n represents the number of implants in a single arch. (FIG. 3)
Method One-B This method begins with an initial scan of the edentulous space to capture the soft tissue and the general shape of the arch 100. The second scan would capture the critical implant features 106 and distances, one exemplary distance being demarcated as D. This can be a combination of using existing scan flags 104 and the digital verification gauge 10 together, or an embodiment of the gauge with integrated scan flag features as also described previously.

Figure 4:
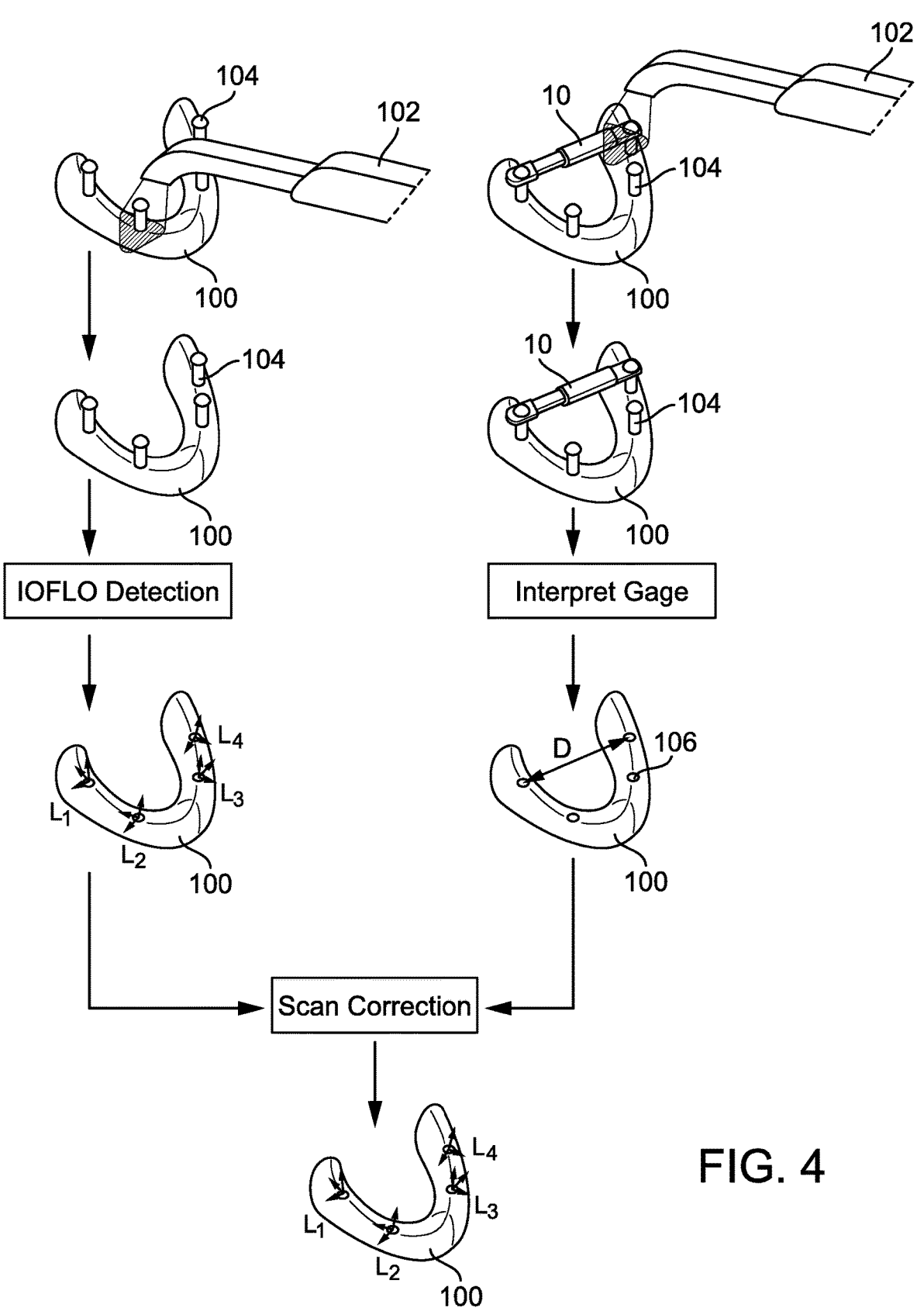
FIG. 4 is a depiction of Method One-B described herein.

The scan, in this scenario can also be repeated multiple times (as depicted in FIG. 4) according to the protocol as defined above in the "one scan method" section of Method One-A.
Method Two-A:

The three scans method also begins with an initial scan of the edentulous space, including an 100, taken with an optical scanner 102. The second scan is taken with the scan flag 104 in place, and can be repeated for each implant location. The third scan will feature the digital verification gauge 10, capturing the implant to implant location, for example D. This scan can also be repeated up to the maximum number of unique implant to implant positions as described above

5

6

Figure 5:
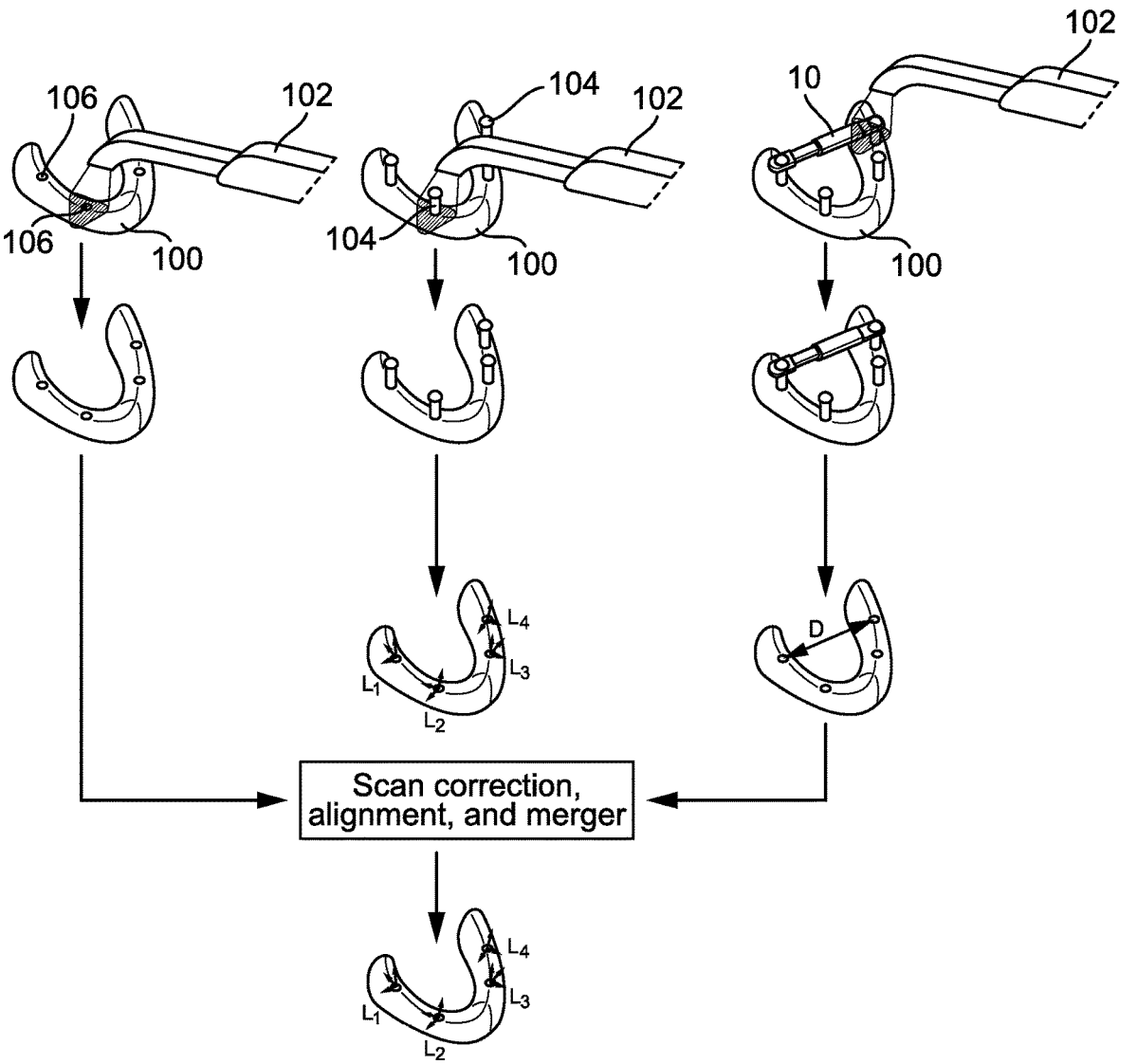
FIG. 5 is a depiction of Method Two-A described herein.

(as depicted in FIG. 5), such as for example L1-L2, L1-3, L1-L4, L2-L3, L2-L4, and L3-L4.

Additional Image Method:

The scan methods described previously only utilize a single scanning source, in this case an intra oral scanning system 102. However, the digital verification gauge can also be used with auxiliary inputs, either in a form of an optical camera or manual recording of the gauge system 10 in place. In using an optical camera, various photogrammetry techniques can be utilized to automatically detect key distances from a two-dimensional image. The optical image can also be interpreted manually as part of the restoration workflow.

Technical Details:

The use of the digital verification gauge 10 during an edentulous scan accomplished two primary tasks. The first is that the gauge 10 can incorporate defining features along the length of the device to aid in the scanning and stitching of the multiple images required to create a full three-dimensional scan. These defining features can be protruding shapes, space out a different distance intervals, and be between 50 microns to 1 centimeter in length.

The second task of the gauge is to serve as a calibration device and allow for additional data points for post processing of the raw scan file. The post processing can be completed either in real time during the scan or at a later point after the scan, either locally or offsite at a remote location or server. Methods of secondary analysis include a scale factor to augment the original scan based on the measurements gathered from the gauge 10 and also fixing localized stitching errors captured in the frame scan.

Figure 6:
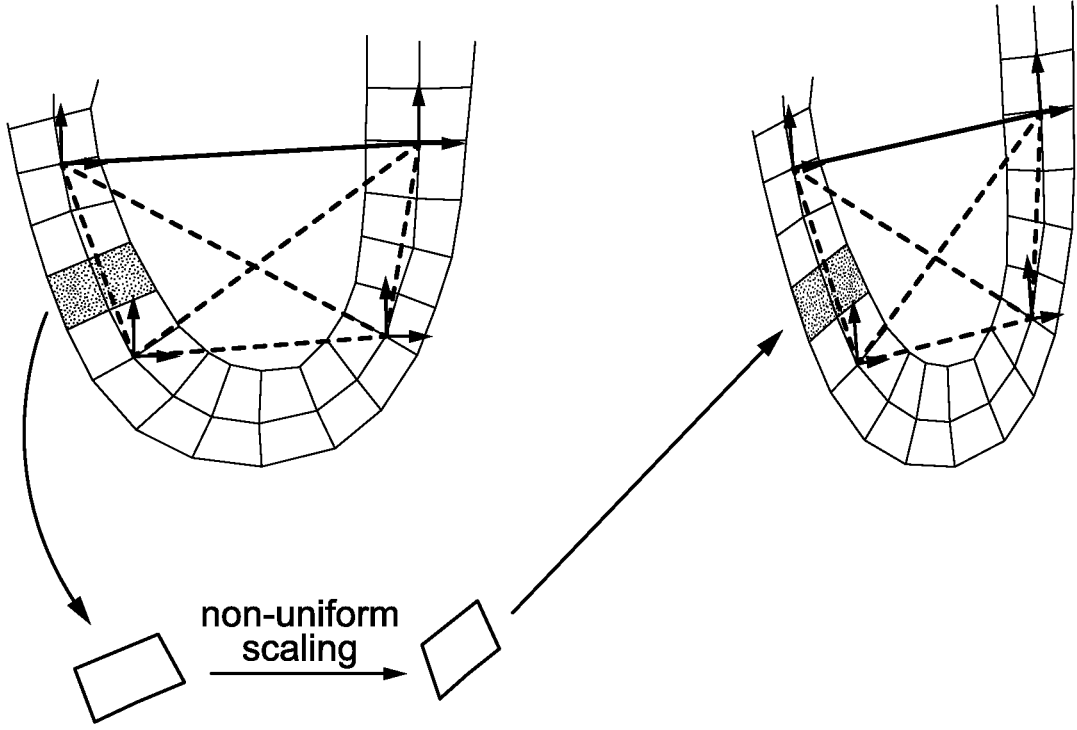
FIG. 6 is a depiction of yet another method described herein.
Figure 7:
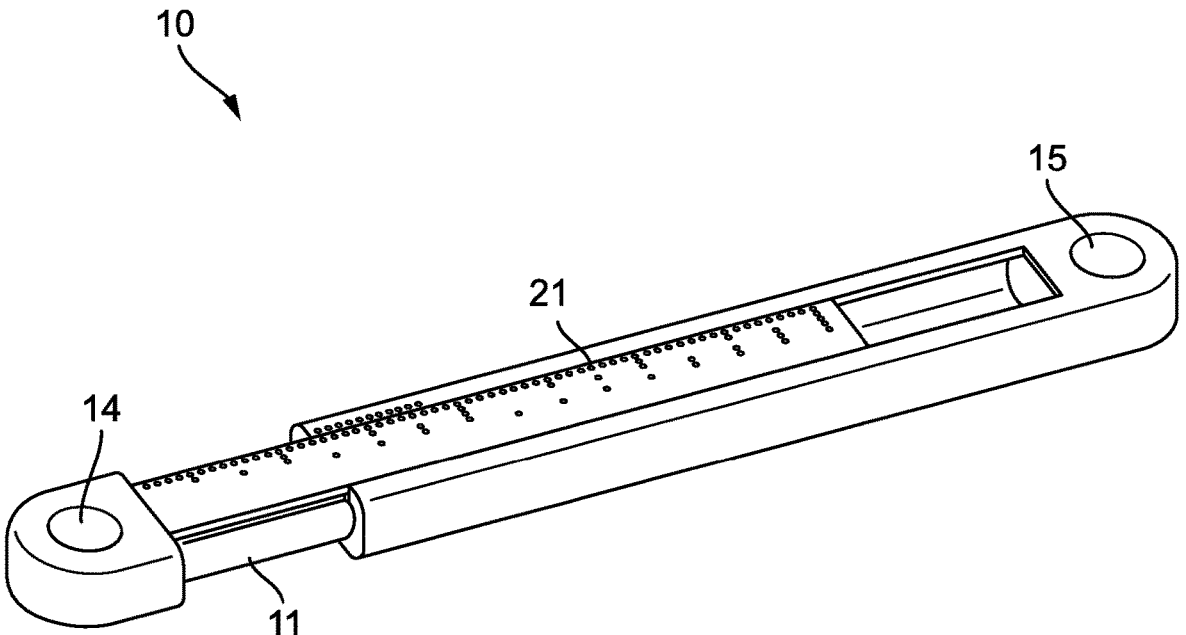
FIG. 7 is a perspective view of a gauge according to the present invention.

The scale factor method is highlighted in FIG. 6, where known distances from the gauge 10 can be used to scale and "calibrate" the scan in a non-uniform manner. Here, the entire scan file is augmented in each of the known orientations from the various scans with the gage in place. As error can be introduced in a non-linear method, the augmentation of the scan can also vary along each axis.

Alternatively, scans with the gauge 10 in place can be used to better inform the frame by frame image stitching process used by the scanning systems. Each image, or series of images, captured by the scanner is overlaid on top of the prior using a best fit algorithm. If not enough unique detail is present in each scan, additional error may be introduced during the stitching process. The known accuracy provided by the gauges can help better inform these stitching algorithms to produce a final scan result that better represents the physical scanning surface. This essentially acts as a real-time offset or coefficient to modify the process during scanning.

It will be appreciated that a gauge and methods of using the gauge as described herein provide a valuable contribution to the art of verifying and improving the accuracy of 3D scans, in particular those used in dental arts. Alternatives to the invention as described are within the scope of the invention and will only be limited by the attached claims.

What is claimed is:

1. A gauge to verify the accuracy of an intra-oral scan of the oral cavity of a patient, comprising:

a straight bar extending from a first end to a second end along a straight line, the bar formed by a housing defining a longitudinal track including an open end and a closed end and an arm that is slidable within the longitudinal track between a plurality of different positions, the arm including the first end and the housing including the second end, a terminal end of the arm opposite the first end configured to contact the closed end of the longitudinal track in a first one of the plurality of positions and be spaced from the closed end of the longitudinal track in other ones of the plurality of positions such that the bar has an adjustable length, the bar being removably affixable at each of the first and second end between two points in the oral cavity, a first one of the two points corresponding to a location of the first end of the bar and a second one of the two points corresponding to a location of the second end of the bar; and visible indicia on the bar for identifying a distance between the two points, the visible indicia including a Vernier scale;

said bar being scannable by the intra-oral scan;

wherein a measurement of the distance between the two points is thereby verified by the visible indicia on the bar and by the scan of said bar.

2. The gauge as in claim 1, the longitudinal track of the housing surrounds at least three sides of the arm when the arm is in the first position.

3. The gauge as in claim 2, wherein the arm is provided with a longitudinal tang that is received within the longitudinal track of the housing.

4. The gauge as in claim 2, wherein, when the arm is in the first position, the terminal end of the arm is located adjacent to the second end of the bar associated with the housing.

5. The gauge as in claim 2, wherein the arm is threaded to the housing by a threaded connection, such that said threaded connection can be manipulated to adjust the distance between the arm and the housing.

6. The gauge as in claim 1, wherein one or both of said first and second ends is configured to be removably affixed to a scan flag.

7. The gauge as in claim 1, wherein one or both of said first and second ends is configured to be removably affixed to a dental implant component.

8. A method of improving the accuracy of a digital image of the oral cavity of a patient, comprising:

making a plurality of first intraoral scans of the oral cavity;

using said plurality of first oral scans to form the digital image of at least one portion of the oral cavity;

providing a straight bar extending from a first end to a second end along a straight line, the bar formed by a housing defining a longitudinal track including an open end and a closed end and an arm that is slidable within the longitudinal track between a plurality of different positions, the arm including the first end and the housing including the second end, a terminal end of the arm opposite the first end configured to contact the closed end of the longitudinal track in a first one of the plurality of positions and be spaced from the closed end of the longitudinal track in other ones of the plurality of positions such that the bar has an adjustable length, the bar being removably affixable at each of the first and second end between two points in the oral cavity, a first one of the two points corresponding to a location of the first end of the bar and a second one of the two points corresponding to a location of the second end of the bar, said bar having visual indicia comprising a Vernier scale to identify the distance between said two points;

removably securing said first end of said bar to one of the points in the oral cavity and said second end of said bar to the other said point in the oral cavity;

making at least one second intraoral scan of the oral cavity including scanning at least a portion of said bar; and using said second scan to make correction adjustments to
the digital image.

* * * * *